F. T. BALDWIN.
MACHINE FOR MAKING WOODEN PINS.
No. 178,227.                                  Patented June 6, 1876.
Fig. I.
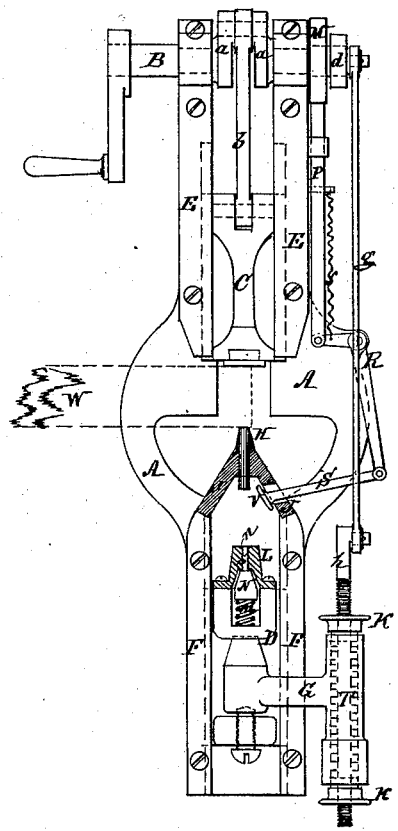
Fig. II.
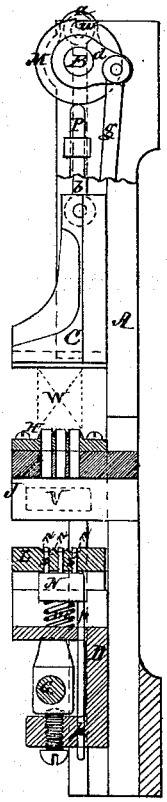
Fig. III.
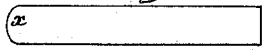
Witnesses.                                    Inventor.

UNITED STATES PATENT OFFICE.

FRANKLIN T. BALDWIN, OF BALDWINSVILLE, NEW YORK.

IMPROVEMENT IN MACHINES FOR MAKING WOODEN PINS.

Specification forming part of Letters Patent No. 178,227, dated June 6, 1876; application filed February 21, 1876.

*To all whom it may concern:*

Be it known that I, FRANKLIN T. BALDWIN, of Baldwinsville, in the State of New York, have invented a new and Improved Machine for Making Wooden Pins, of which the following is a specification:

The nature of my invention consists in the arrangement of the dies that cut the pins upon a block having beveled sides, said bevel beginning from the edges of the dies and extending some distance downward, for the purpose of allowing the block of wood from which the pins are cut to slide easily away during the operation of cutting the pins, at the inclined or beveled side, and at the same time to separate thereby the shavings from the finished pins, so that the same will not become mixed after passing from the machine.

In the accompanying drawing, Figure I represents a top view of the machine embodying my invention. Fig. II is a side view of the same, partly in section. Fig. III shows a finished pin in full size, as usually made.

A is the frame, in one end of which the driving-shaft B is arranged, and provided with suitable guides or ways E and F, in which blocks C and D are made to move forward and backward. The block C receives its desired motion through its connection with the crank $a$ through the rod $b$, and the desired motion is communicated to the block D through the crank $d$, by means of the rods $g$ $h$ and arm G, connected with said block D. Between the ends of the ways E F, or between the blocks C and D, inclined side surfaces J J, pointing toward the block C, are arranged, leaving the top and bottom open, upon the ends of which the die or cutter block H is securely fastened. The end of the block D is recessed and provided with a cover or cap, L. In the end of this cap L recesses or cavities $n$ are made, corresponding in shape with the form the ends of the finished wooden pins are to have. In the cavity formed by the recessed end of the block D and the cap L a block, N, is arranged, guided through its rod $p$, working in the block D, and acted upon by a suitable spring, $m$. To this block N pins or projections $s$ are attached, passing through the block D into the recesses or cavities $n$, for the purpose hereafter described.

The wood from which the pins are to be cut is sawed of the depth corresponding with the required length of the pins, and inserted into the machine between the block C and the die-block H, as shown in dotted lines in the drawing at W. Motion being given to the shaft B, the block C will force this wood upon the die-block H, whereby the knives or cutters in said block will cut off the pins the desired shape, forcing the pins into the holes $v$, passing through the die-block H, and between the sides of the piece J. The inclined surfaces or sides J allow the wooden block W to pass freely past its side, while the block C forces the same downward, and causes, at the same time, all shavings and splinters to fall outside, away and separate from the cut-off pins, which are forced into the space between these inclined surfaces J, and fall or are forced out through the open bottom space between said inclined side surfaces, as hereafter described.

When the block C has been moved back again, the wooden block W is again inserted, when another set of pins is cut off and forced into the holes $v$ upon the top of the pins previously cut off and forced into said holes, whereby the same are moved downward against the cap L and into the recesses $n$. The block D, to which this cap L is attached, is made to move upward during part of the time the block C moves downward and is pushing or forcing the pins toward the block D, whereby the ends of the pins are forced into the cavities $n$, and receive a certain amount of compression, and obtain thereby the desired shape or rounding on their ends, corresponding with the shape of the cavities, as represented at $x$, Fig. III. This amount of compression to be given to the pins for the above-mentioned purpose can be regulated by the relative position of the cranks $a$ and $d$ to each other.

Upon the shaft B a disk, M, is fixed, having a recess, $w$, in its circumference. A rod, P, arranged on the frame, is made to bear against the circumference of this disk M, and is connected at its other end to an arm of a bell-crank, R. To the other arm of this bell-crank a rod, S, is attached, passing through the inclined surface J, and provided with a broad surface or head, V, on its other end. As soon as the block D has completed its back movement, the recess $w$ in the disk M comes in a line with the rod P, which, falling into said recess, causes a sudden motion to the bell-crank, and, consequently, to the end V of the rod S, forcing the same inward, and thereby pushing the finished pins away from the end of the block L.

A suitable channel may be arranged at the bottom of the inclined side surfaces J, and forming a continuation of the same, to conduct these finished pins to any desirable receptacle, free from shavings or splinters.

The pins which have been pressed into the recesses $n$ for the purpose of having their ends molded by compression, in the manner above described, have pressed the pins or projections $s$, during this operation, inward. As soon as the finished pins are pushed away, as above mentioned, the action of the spring $m$ behind the block N, to which these projecting pins $s$ are attached, will again force these pins $s$ outward, so as to project into the cavities $n$, and thereby clear said cavities, after each operation, of any sawdust or gum which may remain in the same.

To prevent any detrimental effect to the machine resulting from any difference in the length of the pins on account of any irregularity in the thickness of the wooden block W, from which the pins are cut, a cylinder or tube, T, is arranged on the arm G, through which the rod $h$ is passed. This rod $h$ has a screw-thread cut, extending nearly its whole length, and is provided with two nuts, K K, one above and one below the cylinder or tube T. Into this tube T, around the rod $h$, strong springs are fixed, upon which the nuts K K are made to bear. These springs may be made of steel; but I prefer to use india-rubber washers, placed one against the other, and said spring must be of sufficient strength to withstand the necessary force required for the compression given to the pins to form their ends into the desired shape.

By this arrangement the exact position of the block D can easily be regulated, and all irregularities resulting from any difference in the length of the pins will thereby be prevented from acting detrimental to the machine, as any excess of pressure resulting therefrom will cause the spring in this tube T to act, and counteract the same.

What I claim as my invention, and desire to secure by Letters Patent, is—

1. In combination with the sliding block D, the arm G, provided with a cylinder or tube, T, with india-rubber or other suitable springs, rod $h$, and nuts K K, the whole being arranged and combined substantially in the manner and for the purpose set forth.

2. In combination with the cap-piece L, provided with recesses or cavities $n$, the block N, operated by a spring, $m$, and provided with projecting pins or points $s$, passing into the cavities $n$ in the cap L, in the manner and for the purpose substantially as specified.

FRANKLIN T. BALDWIN.

Witnesses:
 HENRY E. ROEDER,
 WM. MUNCH.